(12) United States Patent
Watts et al.

(10) Patent No.: US 10,239,387 B2
(45) Date of Patent: Mar. 26, 2019

(54) SUN VISOR RETENTION SYSTEM

(71) Applicants: Robert Watts, Birmingham, AL (US); Eric Penn, Birmingham, AL (US)

(72) Inventors: Robert Watts, Birmingham, AL (US); Eric Penn, Birmingham, AL (US)

( * ) Notice: Subject to any disclaimer, the term of this patent is extended or adjusted under 35 U.S.C. 154(b) by 14 days.

(21) Appl. No.: 15/144,289

(22) Filed: May 2, 2016

(65) Prior Publication Data
US 2017/0313163 A1    Nov. 2, 2017

(51) Int. Cl.
B60J 3/02    (2006.01)

(52) U.S. Cl.
CPC .................... B60J 3/0265 (2013.01)

(58) Field of Classification Search
CPC ................ B60J 3/0213; B60J 3/026
USPC .............................. 296/97.12, 97.9
See application file for complete search history.

(56) References Cited

U.S. PATENT DOCUMENTS

| | | | | |
|---|---|---|---|---|
| 2,424,500 A * | 7/1947 | Peltier | .................... | B60J 3/0217 248/278.1 |
| 2,454,613 A * | 11/1948 | Peltier | .................... | B60J 3/0217 248/278.1 |
| 3,415,569 A * | 12/1968 | Leevo | .................... | B60J 3/0208 296/97.6 |
| 4,053,180 A * | 10/1977 | White | .................... | B60J 3/0208 296/97.6 |
| 4,377,020 A * | 3/1983 | Vigo | .................... | B60J 3/0217 16/329 |
| 4,785,500 A * | 11/1988 | Langridge | .............. | B60J 3/0265 16/297 |
| 4,913,484 A | 4/1990 | Dowd et al. | | |
| 4,921,300 A * | 5/1990 | Lawassani | ............ | B60J 3/0217 296/97.11 |
| 5,190,339 A | 3/1993 | Ceideberg | | |
| 5,251,949 A * | 10/1993 | Miller | .................... | B60J 3/0265 16/297 |
| 5,338,083 A * | 8/1994 | Gute | ...................... | B60J 3/0265 296/97.12 |
| 5,858,370 A | 1/1999 | Deans et al. | | |
| 5,967,589 A | 10/1999 | Spadafora | | |
| 6,079,685 A | 6/2000 | Jacquemin | | |
| 6,863,332 B2 * | 3/2005 | Yasuhara | .................. | B60J 3/02 296/97.9 |
| 8,020,914 B2 | 9/2011 | Burns | | |
| D652,830 S | 1/2012 | Nazar | | |
| 8,689,404 B2 * | 4/2014 | Hsu | ...................... | G06F 1/1681 16/337 |
| 9,132,719 B1 * | 9/2015 | Pernia | .................... | B60J 3/0208 |
| 2004/0046411 A1 | 3/2004 | Beaver et al. | | |
| 2017/0240026 A1 * | 8/2017 | Abruzzio | .............. | B60J 3/0217 |

* cited by examiner

Primary Examiner — Pinel E Romain

(57) ABSTRACT

A sun visor retention system includes a vehicle that has at least one sun visor. The at least one sun visor has a support bar and a panel that is rotatably coupled to the support bar. A retainer is removably coupled to the at least one sun visor. The retainer selectively frictionally engages the support bar. The retainer engages the panel such that the retainer retains the panel at a selected angle of rotation about the support bar.

6 Claims, 4 Drawing Sheets

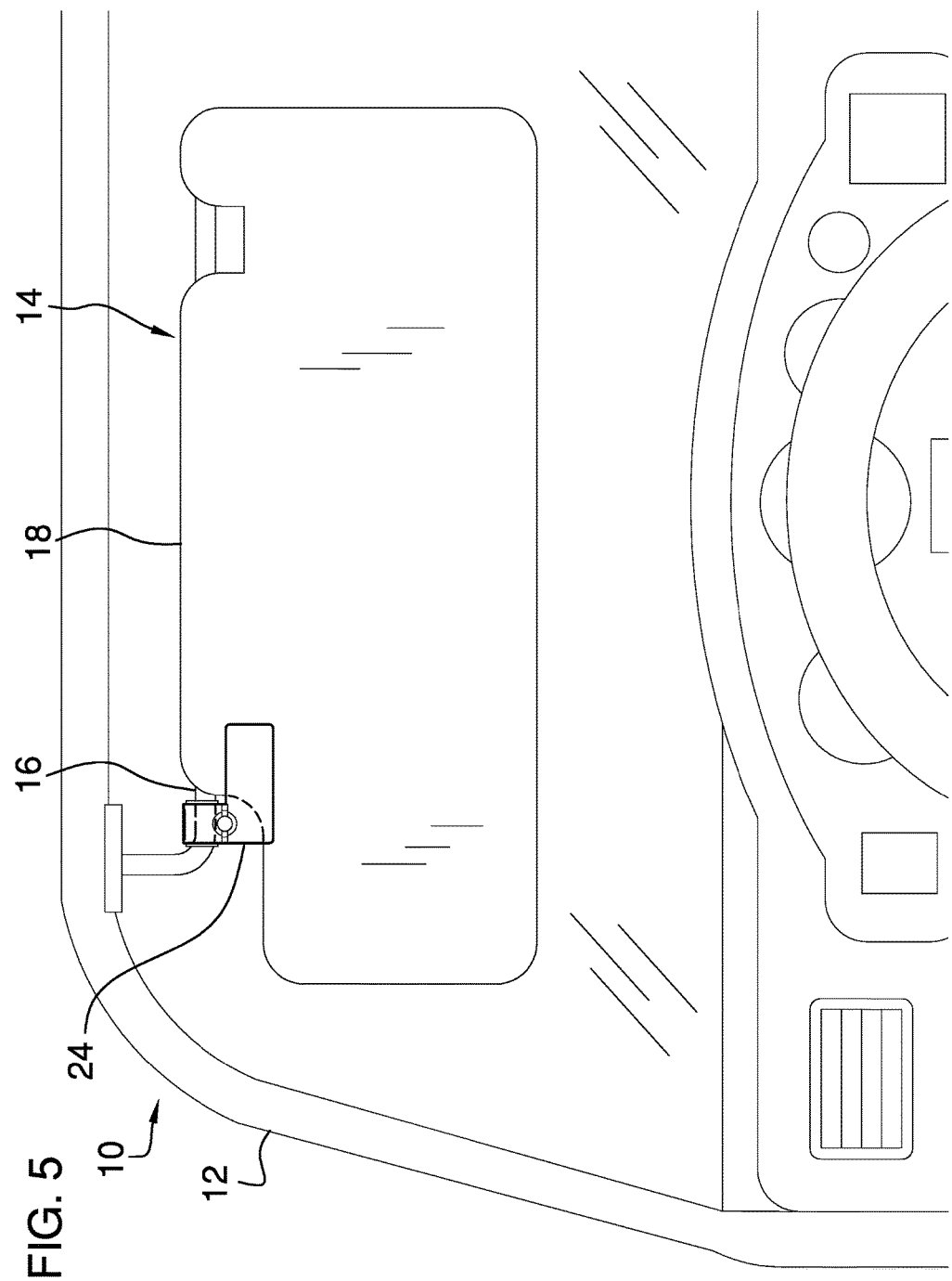

SUN VISOR RETENTION SYSTEM

BACKGROUND OF THE DISCLOSURE

Field of the Disclosure

The disclosure relates to retention devices and more particularly pertains to a new retention device for retaining a sun visor at a selected position.

SUMMARY OF THE DISCLOSURE

An embodiment of the disclosure meets the needs presented above by generally comprising a vehicle that has at least one sun visor. The at least one sun visor has a support bar and a panel that is rotatably coupled to the support bar. A retainer is removably coupled to the at least one sun visor. The retainer selectively frictionally engages the support bar. The retainer engages the panel such that the retainer retains the panel at a selected angle of rotation about the support bar.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 5 is a perspective in-use view of an embodiment of the disclosure.

DESCRIPTION OF THE PREFERRED EMBODIMENT

Figure 1:
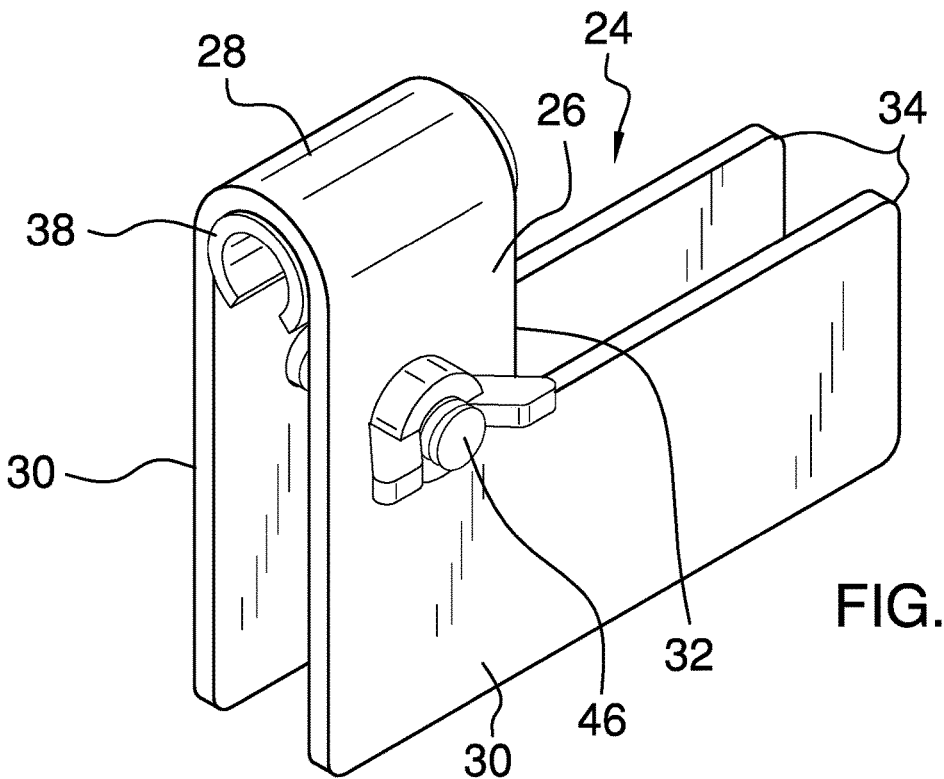
FIG. 1 is a perspective view of a sun visor retention system according to an embodiment of the disclosure.
Figure 2:
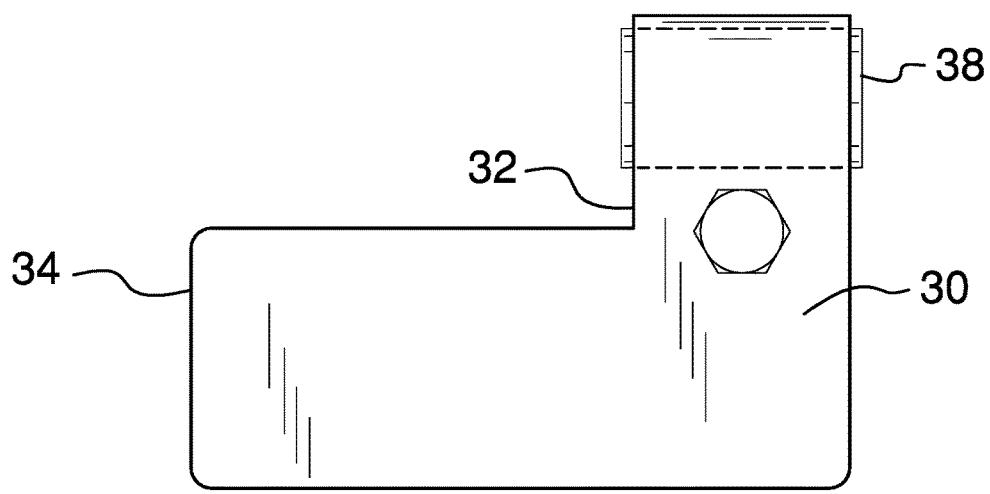
FIG. 2 is a back view of an embodiment of the disclosure.
Figure 3:
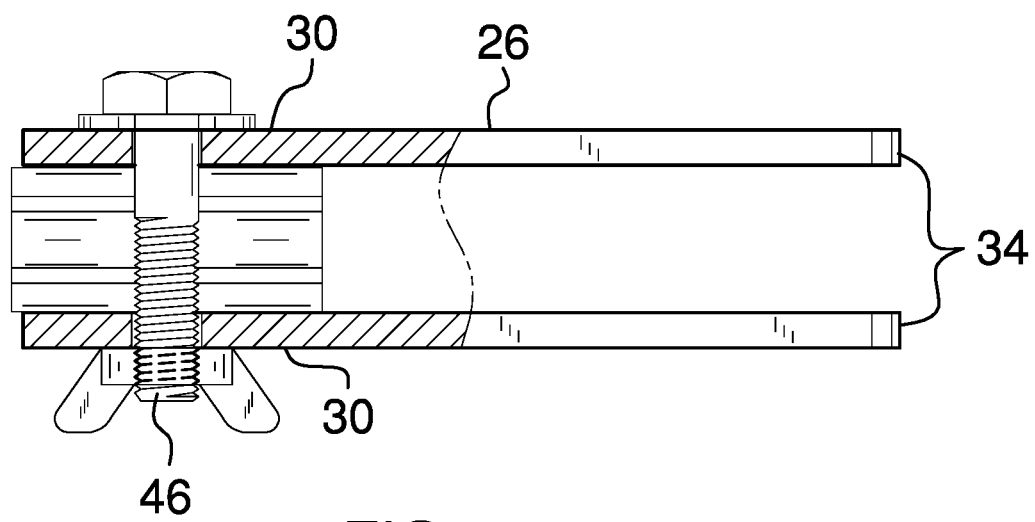
FIG. 3 is a bottom cut-away view of an embodiment of the disclosure.
Figure 4:
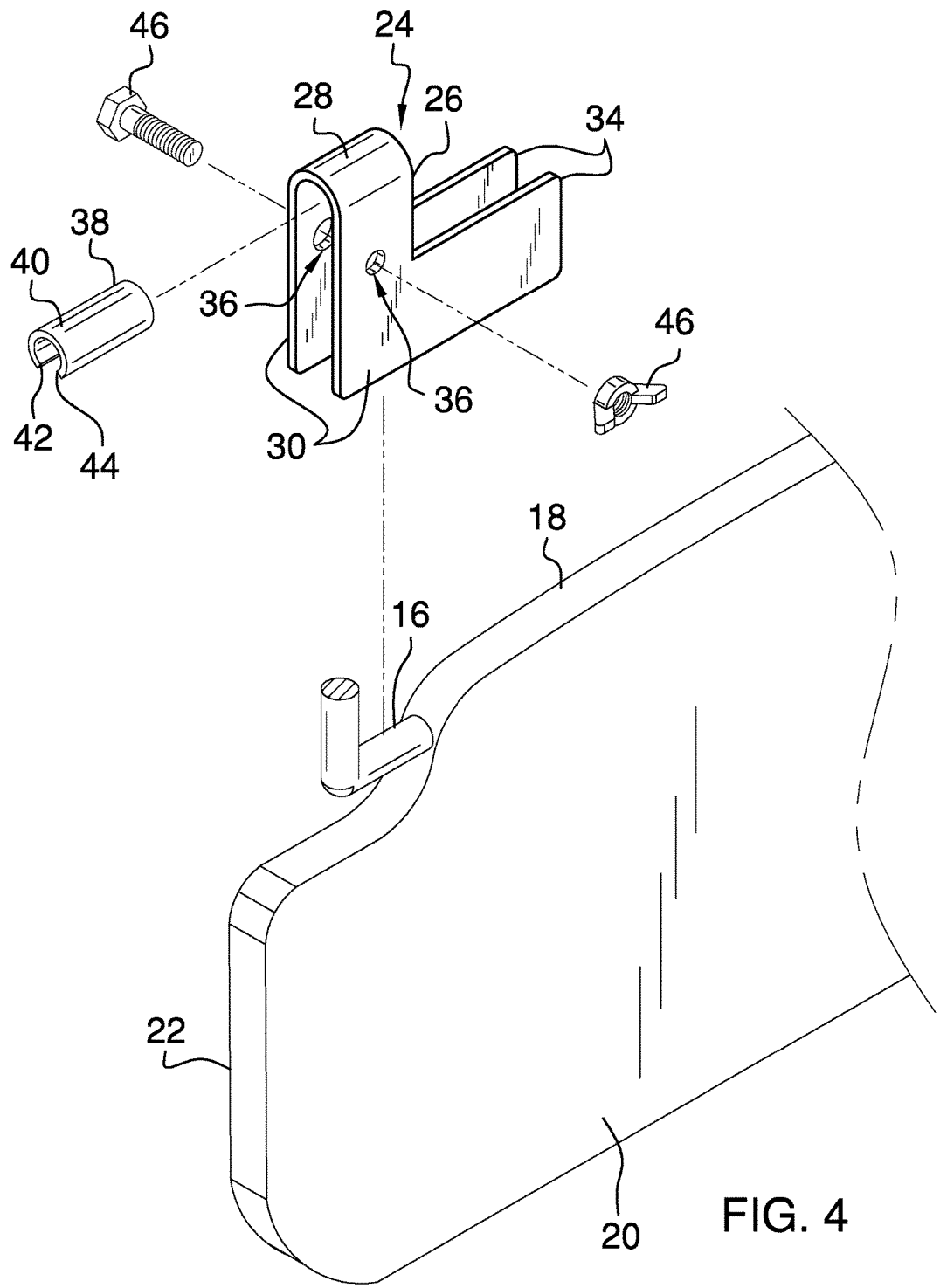
FIG. 4 is an exploded perspective view of an embodiment of the disclosure.

With reference now to the drawings, and in particular to FIGS. 1 through 5 thereof, a new retention device embodying the principles and concepts of an embodiment of the disclosure and generally designated by the reference numeral 10 will be described.

As best illustrated in FIGS. 1 through 5, the sun visor retention system 10 generally comprises a vehicle 12 that has at least one sun visor 14. The at least one sun visor 14 has a support bar 16 and a panel 18 that is rotatably coupled to the support bar 16. The panel 18 has a first side 20 and a second side 22. The vehicle 12 may be a passenger vehicle or the like.

A retainer 24 is removably coupled to the at least one sun visor 14. The retainer 24 selectively and frictionally engages the support bar 16. The retainer 24 engages the panel 18 such that the retainer 24 retains the panel 18 at a selected angle of rotation about the support bar 16. The retainer 24 may be retro fitted to an existing sun visor when the panel 18 no longer stays at a selected position.

The retainer 24 comprises a bracket 26 that has a central portion 28 extending between a pair of legs 30. The legs 30 are spaced apart from each other. The central portion 28 is curved between each of the legs 30. Each of the legs 30 has a first lateral edge 32.

Each of the legs 30 includes a tab 34. The tab 34 corresponding to each of the legs 30 extends away from the first lateral edge 32 of the corresponding leg 30. The tab 34 corresponding to each of the legs 30 is spaced apart from each other. Each of the legs 30 has an opening 36 extending therethrough. The opening 36 corresponding to each of the legs 30 is aligned with each other.

A bushing 38 is provided and the bushing 38 has an outer wall 40. The outer wall 40 has a first lateral edge 42 and a second lateral edge 44. The outer wall 40 is curved having the first lateral edge 42 being spaced from the second lateral edge 44. Thus, the bushing 38 is substantially cylindrically shaped. The bushing 38 is positioned to abut the central portion 28 of the bracket 26 having the bushing 38 being positioned between the legs 30. The support bar 16 extends through the bushing 38 when the retainer 24 engages the support bar 16. The tab 34 corresponding to each of the legs 30 frictionally engages an associated one of the first side 20 of the panel 18 and the second side 22 of the panel 18 when the retainer 24 engages the support bar 16.

A fastener 46 extends through each of the openings 36 in the bracket 26. The fastener 46 selectively urges each of the legs 30 toward each other. Thus, the bushing 38 is compressed against the support bar 16. The bracket 26 is retained at a selected angle of rotation about the support bar 16 when the fastener 46 is tightened. Each of the tabs 34 retains the panel 18 at the selected angle of rotation about the support bar 16 when the fastener 46 is tightened. The fastener 46 may comprise a nut and a bolt or the like.

In use, the bushing 38 is placed around the support bar 16. The bracket 26 is placed on the bushing 38 having each of the tabs 34 frictionally engaging the associated first 20 and second 22 sides of the panel 18. The fastener 46 is extended through the bracket 26. The panel 18 is positioned at a selected angle of rotation about the support bar 16. The fastener 46 is tightened to retain the panel 18 at the selected angle of rotation.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A sun visor retention system comprising:
a vehicle having at least one sun visor, said at least one sun visor having a support bar and a panel being rotatably coupled to said support bar; and
a retainer being removably coupled to said at least one sun visor, said retainer selectively frictionally engaging said support bar, said retainer engaging said panel such that said retainer retains said panel at a selected angle of rotation about said support bar, said retainer comprising a bracket having a central portion extending between a pair of legs, said legs being spaced apart from each other, said central portion being curved between each of said legs, each of said legs having a first lateral edge, each of said legs includes a tab, said tab corresponding to each of said legs extending away from said first lateral edge of said corresponding leg, said tab corresponding to each of said legs being spaced apart from each other.

2. The system of claim 1, further comprising:
said panel having a first side and a second side; and
said retainer comprising:
  each of said legs having an opening extending therethrough, said opening corresponding to each of said legs being aligned with each other,
  a bushing having an outer wall, said outer wall having a first lateral edge and a second lateral edge, said outer wall being curved having said first lateral edge being spaced from said second lateral edge such that said bushing is substantially cylindrically shaped, said bushing being positioned to abut said central portion of said bracket having said bushing being positioned between said legs, said support bar extending through said bushing when said retainer engages said support bar, each of said tabs frictionally engaging an associated one of said first side of said panel and said second side of said panel when said retainer engages said support bar; and
  a fastener extending through each of said openings in said bracket, said fastener urging each of said legs toward each other such that bushing is compressed against said support bar thereby retaining said bracket at a selected angle of rotation about said support bar when said fastener is tightened, each of said tabs retaining said panel at said selected angle of rotation about said support bar when said fastener is tightened.

3. The system according to claim 1, wherein each of said legs has an opening extending therethrough, said opening corresponding to each of said legs being aligned with each other.

4. A sun visor retention system comprising:
a vehicle having at least one sun visor, said at least one sun visor having a support bar and a panel being rotatably coupled to said support bar; and
a retainer being removably coupled to said at least one sun visor, said retainer selectively frictionally engaging said support bar, said retainer engaging said panel such that said retainer retains said panel at a selected angle of rotation about said support bar, said retainer comprising a bracket having a central portion extending between a pair of legs, said legs being spaced apart from each other, said central portion being curved between each of said legs, each of said legs having a first lateral edge, each of said legs has an opening extending therethrough, said opening corresponding to each of said legs being aligned with each other, each of said legs including a tab; and
a fastener extending through each of said openings in said legs, said fastener urging each of said legs toward each other such that a bushing positioned between said legs is compressed against said support bar thereby retaining said bracket at a selected angle of rotation about said support bar when said fastener is tightened, each of said tabs retaining said panel at said selected angle of rotation about said support bar when said fastener is tightened.

5. A sun visor retention system comprising:
a vehicle having at least one sun visor, said at least one sun visor having a support bar and a panel being rotatably coupled to said support bar; and
a retainer being removably coupled to said at least one sun visor, said retainer selectively frictionally engaging said support bar, said retainer engaging said panel such that said retainer retains said panel at a selected angle of rotation about said support bar, said retainer comprising
  a bracket having a central portion extending between a pair of legs, said legs being spaced apart from each other, said central portion being curved between each of said legs, each of said legs having a first lateral edge, and
  a bushing having an outer wall, said outer wall having a first lateral edge and a second lateral edge, said outer wall being curved having said first lateral edge being spaced from said second lateral edge such that said bushing is substantially cylindrically shaped, said bushing being positioned to abut said central portion of said bracket having said bushing being positioned between said legs.

6. The system according to claim 5, wherein:
said bracket includes a pair of tabs;
said panel has a first side and a second side; and
said support bar extending through said bushing when said retainer engages said support bar, each of said tabs frictionally engaging an associated one of said first side of said panel and said second side of said panel when said retainer engages said support bar.

* * * * *